Figure 1:
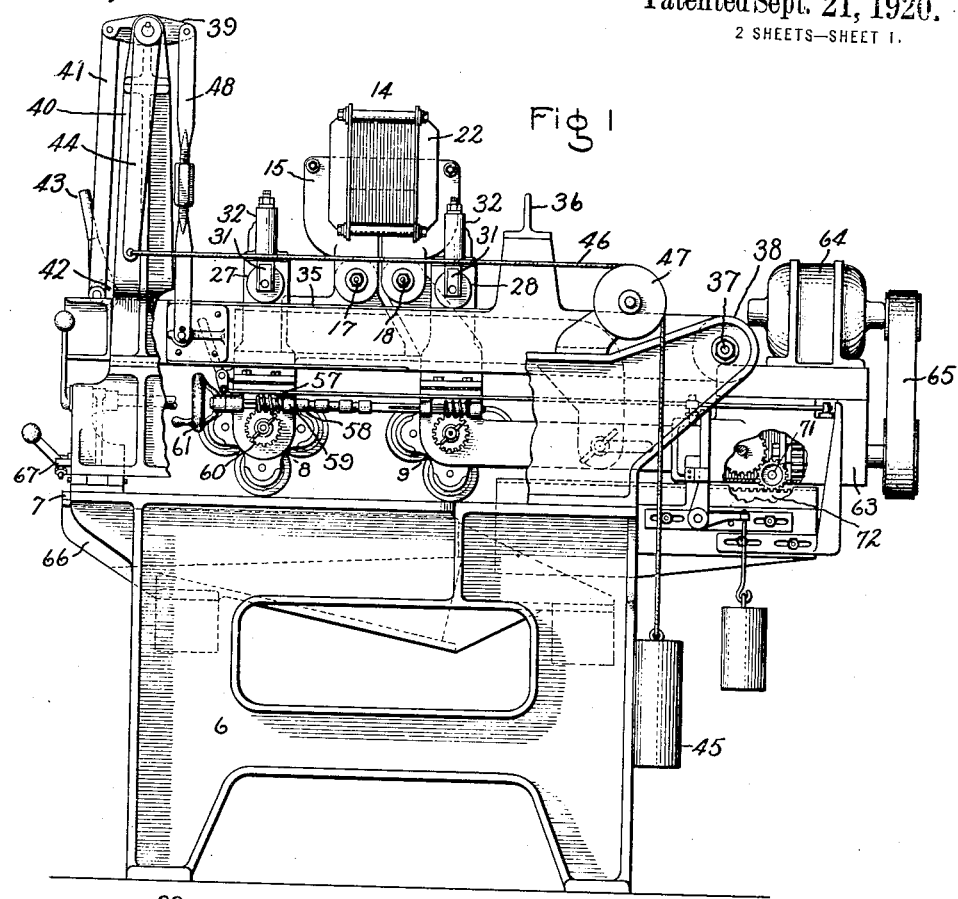

R. E. WAGNER AND W. E. LAIRD.
WELDING MACHINE.
APPLICATION FILED APR. 9, 1919.

1,353,684.

Patented Sept. 21, 1920.
2 SHEETS—SHEET 1.

Inventors:
Wesley E. Laird,
Robert E. Wagner,
by Albert G. Davis
Their Attorney.

R. E. WAGNER AND W. E. LAIRD.
WELDING MACHINE.
APPLICATION FILED APR. 9, 1919.

1,353,684.

Patented Sept. 21, 1920.
2 SHEETS—SHEET 2.

Inventors:
Wesley E. Laird,
Robert E. Wagner.
by
Their Attorney.

UNITED STATES PATENT OFFICE.

ROBERT E. WAGNER AND WESLEY E. LAIRD, OF PITTSFIELD, MASSACHUSETTS, ASSIGNORS TO GENERAL ELECTRIC COMPANY, A CORPORATION OF NEW YORK.

WELDING-MACHINE.

1,353,684.  Specification of Letters Patent.  Patented Sept. 21, 1920.

Application filed April 9, 1919. Serial No. 288,780.

*To all whom it may concern:*

Be it known that we, ROBERT E. WAGNER and WESLEY E. LAIRD, citizens of the United States, residing at Pittsfield, in the county of Berkshire, State of Massachusetts, have invented certain new and useful Improvements in Welding-Machines, of which the following is a specification.

Our present invention relates to line welding and it is one object of this invention to provide a machine having a longer stroke than machines formerly employed and which will operate with a substantially constant impedance with the passage of the welding electrodes over the work.

A further object of our invention is to provide a machine in which the transformer shall be carried by the moving electrodes, thereby doing away with flexible connections or connections which make sliding contact during the normal operation of the apparatus, and to provide a machine in which the weight of the transformer is utilized to furnish the pressure upon the welding electrodes.

A further object of our invention is to provide a machine comprising a plurality of electrodes, the distance between which may be adjusted to accommodate various classes of work.

A further object of our invention is to provide a machine comprising a plurality of electrodes so arranged that they may move independently to adjust themselves to irregularities in the work.

In our previously issued Patent 1,282,502, granted October 22, 1918, we have described a line welding machine having an arm provided with a welding electrode movable over the joint or seam to be welded, the voltage of the welding current being automatically raised as the impedance of the welding circuit increased due to a greater amount of stock (generally iron) being interlinked with the welding circuit, and the welding circuit being lengthened with the passage of the welding electrode over the stock.

In accordance with our present invention, a pair of linearly movable welding electrodes are operated in tandem linearly over the work, the welding current preferably being supplied by a transformer carried by the welding heads upon which the electrodes are mounted. The movable electrodes preferably are connected in series to the transformer, the welding circuit being completed through a stationary electrode on the opposite side of the work. These and other features of our invention are set forth in the claims and described in detail in the following specification taken in connection with the accompanying drawings.

Figure 2:
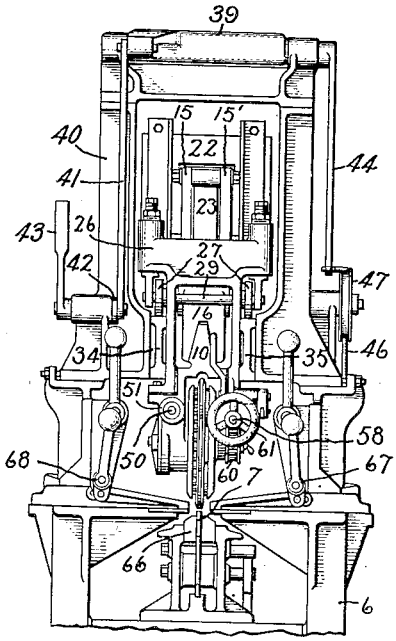
Figure 3:
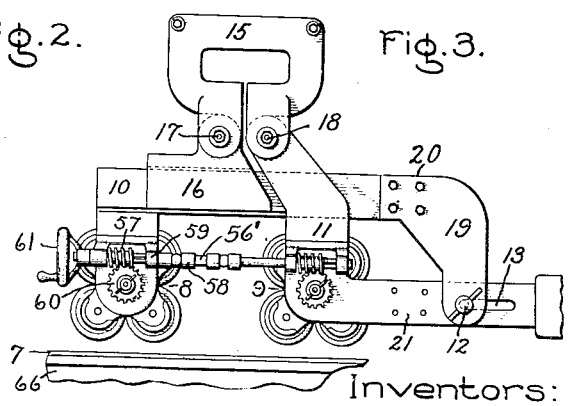
Figure 4:
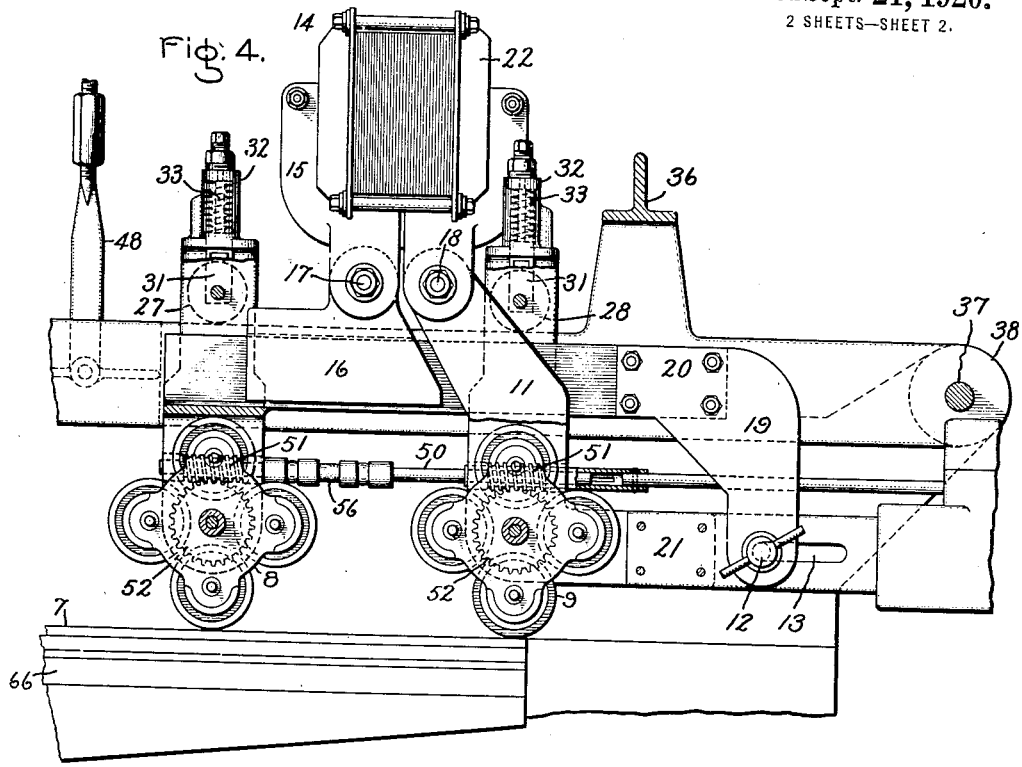
Figure 5:
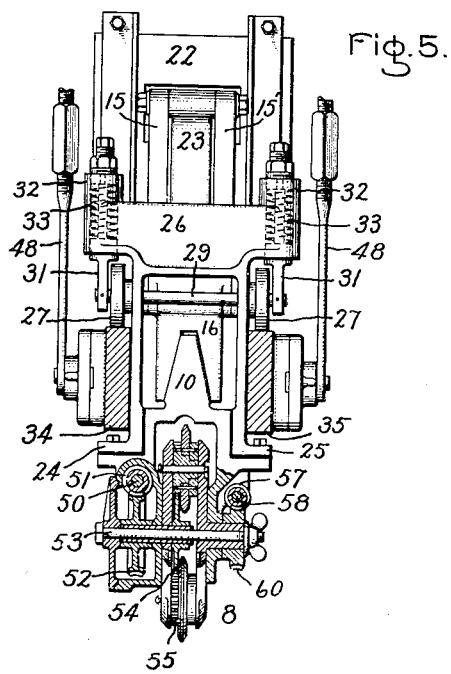

Figure 1 is a side elevation of a line welding machine embodying our invention; Fig. 2 is a front elevation of the welding head; Fig. 3 illustrates the position of the electrodes after the completion of the return stroke after welding when automatically brought clear of the work; Fig. 4 is a side elevation of the welding head, part of the mechanism being broken away, to illustrate the gearing for positively rotating the electrodes while welding and Fig. 5 is a front view partly in section of the welding head.

Referring to Fig. 1, the welding machine comprises a frame 6, carrying an adjustable bar electrode shown at 7, Fig. 2, on which is rested the work to be welded. The movable welding head as shown in Fig. 3 comprises two sets of roller electrodes 8, 9 carried respectively by arms 10, 11 which are linked together adjustably, by a bolt and wing nut 12 passing through a slot 13 in the arm 11. The welding transformer 14 (Fig. 1) is carried by the welding head. The secondary winding 15 is electrically connected to the arm 10 by a V-shaped shoe 16 slidably mounted on the arm 10 and pivotally joined to the transformer secondary at 17. The opposite terminal of the secondary is pivotally connected to the arm 11 by means of a bolt 18. The member 19 connecting the arms 10 and 11 is suitably insulated electrically at 20 and 21. The slot 13 and the slidable connection between arm 10 and shoe 16 permit of readily adjusting the distance between the roller electrodes 8 and 9 to any desired value to accommodate various classes of work. As shown in Fig. 5, the welding transformer consists of a core 22, a primary winding 23 and a secondary winding consisting of two parts 15, 15'. The arm 10 is connected by two pairs of uprights 24, 25 to a cross-bar 26 which is supported on two sets of rollers 27, 28, each set being mounted on a shaft as shown at 29, Fig. 5. The shaft 29 is rotatably supported by the pins 31 sliding within the cylinder 32 and cushioned by springs 33. By adjusting the stiffness of the springs 33 more or less of the weight of the transformer 14 may be transferred to the parallel bars or rails 34, 35 upon which the rollers 27, 28 are arranged to bear and in this way the pressure exerted by the welding electrodes upon the work may be adjusted. Usually, however, the bars 34 and 35 merely guide the electrodes and keep the transformer in a vertical position above the electrodes, and do not carry any of the weight of the transformer except when raised as hereinafter described. The bars 34, 35 are joined together by a cross-bar 36, shown in section, Fig. 4, and are supported pivotally at 37 to a projecting arm 38 of the frame of the welding machine.

The bars 34, 35 are supported at the end opposite the pivot 37 upon a rocker arm 39 pivoted to a standard 40 and connected by a lever 41, to a cam 42 operable by a handle 43. On the opposite side of the rocker arm 39 is a lever 44 to the lower end of which is attached a weight 45 by a cable 46 passing over a pulley 47. The weight 45 acts as a counterbalance to assist in raising the bars 34, 35, which are connected to the rocker 39 by the levers 41, 48.

The roller electrode mechanism is similar to the mechanism described and claimed in our prior patent and hence will be but briefly described herein in order to make clear a modified arrangement for interchanging one roller for another after each welding stroke in order to keep down the temperature of the rollers.

The roller electrodes are positively rotated, as the welding progresses, by the shaft 50 acting on the gears 51, 52. As shown in Fig. 5, the gear 52 is mounted on a shaft 53 in common with gears 54 which engages with a gear 55 mounted adjacent the welding rollers and in fixed relation thereto, thus rotating the roller electrode. A suitable insulating link 56 is provided in the shaft 50. A similar insulating link 56' is provided in shaft 58.

During the forward stroke of the welding electrodes, the worm gear 57 on the shaft 58 is prevented from turning by engagement with the shoulder 59, but when the travel of the welding heads is reversed the reverse rotation of the gear 60 moves the worm gear 57 to the left, as shown in Fig. 3, and a partial rotation of the group of roller electrodes occurs bringing the current electrode, which has just made a welding stroke clear from the work as shown in this figure. The operator thereupon by turning the hand wheel 61 substitutes a succeeding roller electrode for the electrodes just used, first, however, lifting the welding heads 8, 9 slightly by a forward motion of the handle 43, as already described. Another sheet to be welded may then be inserted, the welding heads lowered upon the work and another weld made.

The gear mechanism comprising the gear 71 and rack 72 for moving the electrodes, and the reversing device for changing the direction of travel of the electrodes are described in our prior Patent #1,282,502. The gear mechanism is contained within a case 63 (partly broken away to show the gears) upon which is mounted a driving motor 64 connected to the gear mechanism by a belt 65. As in the case of our prior patent movement of the arm 11, which is rigidly connected to the gear case 63, causes the gear case to pivot about the shaft of gear 72 whenever the arm 11 is lifted through the action of cam lever 43 and bars 34 and 35. Moreover, the pivot points 12, 17, 18 and 72 permit the electrodes 8 and 9 to move independently to adjust themselves to irregularities in the work. The adjustable supporting jaws 66 for the lower bar electrode 7 and the mechanism 67, 68 for determining the proper welding position of the work in the machine, are also described and claimed in our prior Patent #1,282,502 and form no part of the present invention.

What we claim as new and desire to secure by Letters Patent of the United States, is:—

1. An electric resistance welder comprising a plurality of electrodes operable in tandem linearly with respect to the work, a coöperating electrode and a source of current having its terminals connected to said electrodes for passing current through the work between said respective tandem electrodes and said coöperating electrode.

2. An electric resistance welder comprising a stationary electrode, a plurality of electrodes coöperating therewith, spaced apart and adapted to be reciprocated in tandem over a joint or seam to be welded and means for passing current between said tandem electrodes and said stationary electrode in series through the work.

3. An electric resistance line welding machine comprising a linearly reciprocating welding head, a roller electrode carried by said head, a coöperating electrode, a transformer connected to said electrodes and supported to exert pressure upon work between said electrodes.

4. An electric resistance welder comprising a plurality of line welding electrodes, a common electrically insulated mount for said electrodes, power means for reciprocating said electrodes and mount over the work, and means for completing an electrical circuit through the work between said electrodes.

5. An electric resistance welding machine comprising a plurality of line welding electrodes, a common mount for said electrodes, means for insulating said electrodes from each other, means for reciprocating said electrodes over the work in tandem, a welding transformer having a secondary winding connected in circuit with said electrodes and exerting pressure upon said electrodes and means for completing an electric circuit through the work between said electrodes.

6. An electric resistance welding machine comprising coöperating electrodes, at least one of which is movable with respect to work engaged by said electrodes, and a transformer movable with said electrode and having a winding in circuit with said electrode.

7. An electric resistance line welding machine comprising coöperating electrodes one of which is movable linearly over work engaged by said electrodes and a transformer having a winding in circuit with said electrodes and exerting pressure upon said linearly movable electrode.

8. An electric resistance line welding machine comprising linearly reciprocating welding heads, welding electrodes mounted thereon, a transformer carried by said welding heads and having a secondary winding connected to said electrodes, means for moving said electrodes over the work, and means for completing an electrical circuit between said electrodes.

9. An electric welding machine provided with a welding head movable over the work, said head comprising a pair of arms each provided with an electrode, means whereby said arms may be relatively adjusted to vary the distance between said electrodes and a transformer carried by said welding head and provided with terminals electrically connected to said electrodes.

10. A line welding machine comprising a pair of electrodes, a pair of pivotally mounted arms to which said electrodes are secured and a transformer pivotally supported upon said arms.

11. A line welding machine comprising a pair of electrodes, a pair of pivotally mounted arms to which said electrodes are secured, a transformer pivotally supported upon said arms and means whereby the distance between said electrodes may be adjusted.

12. A line welding machine comprising a pair of electrodes, a member carrying one of said electrodes and arranged to move the same over the work, a second member carrying the other electrode adjustably and pivotally connected to said first electrode carrying member, a transformer having secondary terminals pivotally mounted on said members and arranged to supply current to said electrodes, and a slidable electrical connection between one of said members and a transformer terminal whereby the distance between the electrodes may be adjusted and whereby the electrodes may move independently to accommodate irregularities in the work.

13. A line welding machine comprising a plurality of pivotally mounted arms, an electrode mounted upon each arm, a transformer connected to said electrodes and mounted so as to exert pressure upon said electrodes, and means comprising a pair of pivoted bars whereby said electrodes may be raised and lowered.

14. A line welding machine comprising a gear case including a shaft arranged to provide a pivotal mounting for said gear case, a member rigidly secured to said gear case, a welding electrode mounted on said member, whereby said electrode is movable about said shaft as a pivot, an arm pivotally secured to said member, a second electrode mounted on said arm, a transformer pivotally mounted upon said member and said arm to exert pressure upon said electrodes, means whereby said shaft may be revolved to traverse said electrodes over the work, a pivotally mounted rail, and bearing rollers for guiding said electrodes along said rail.

15. A line welding machine comprising a gear case including a shaft arranged to provide a pivotal mounting for said gear case, a member rigidly secured to said gear case, a welding electrode mounted on said member, whereby said electrode is movable with said gear case about said shaft as a pivot, an arm pivotally secured to said member, a second electrode mounted on said arm, a transformer pivotally mounted upon said member and said arm to exert pressure upon said electrodes, means whereby said shaft may be revolved to traverse said electrodes over the work, a pair of bars arranged to guide said electrodes over the work and means whereby said bars may be operated to lift the electrodes away from the work.

In witness whereof we have hereunto set our hands this 7th day of April 1919.

ROBERT E. WAGNER.
WESLEY E. LAIRD.